United States Patent [19]

Freeman et al.

[11] 3,821,813

[45] June 28, 1974

[54] WASP-WAIST HEAD FOR FLYING FLEXIBLE MAGNETIC STORAGE MEDIUM OVER HEAD

[75] Inventors: Fredric R. Freeman; William R. Golz; William K. Taylor, Jr., all of Boulder, Colo.

[73] Assignee: International Business Machines Corporation, Armonk, N.Y.

[22] Filed: Dec. 27, 1972

[21] Appl. No.: 318,973

[52] U.S. Cl. .............................................. 360/103

[51] Int. Cl. .......................... G11b 5/60, G11b 5/24

[58] Field of Search ..............179/100.2 P, 100.2 C, 179/100.2 CA; 340/174.1 E, 174.1 F; 346/74 MC

[56] References Cited

UNITED STATES PATENTS

| | | | |
|---|---|---|---|
| 3,243,521 | 3/1966 | Lock | 179/100.2 C |
| 3,313,889 | 4/1967 | Machinski | 179/100.2 C |
| 3,440,360 | 4/1969 | Sugaya | 179/100.2 C |
| 3,688,285 | 8/1972 | Lawrence et al. | 179/100.2 P |
| 3,696,350 | 10/1972 | Cohen et al. | 340/174.1 E |

*Primary Examiner*—Bernard Konick
*Assistant Examiner*—Robert S. Tupper
*Attorney, Agent, or Firm*—Homer L. Knearl

[57] ABSTRACT

In rotating head magnetic recorders high density recording with little or no wear to the magnetic head or the magnetic tape has been achieved with a wasp-waist flying head. The tape flies in the range of approximately 20–50 microcinches from the surface of the head. Initially the top surface of the head is single radius or bi-radius in contour. Sides of the head are beveled so as to give a wasp-waist shape to the top surface of the head. Further, the top surface of the head is polished, usually with abrasive tape to smooth sharp edges of the head and also to more nearly conform the top surface of the head to the aerodynamic bulge in the magnetic tape that occurs as the tape flies over the head. The head is mounted with the wider portion or frontal face of its top surface forming an angle of attack between the frontal face and the medium. Air caught between this frontal face and the tape is later partially dissipated as the tape moves past the narrow waist of the top surface of the head. Initially an air wedge lifts the tape away from the head, and subsequently the tape is lowered uniformly towards the narrow waist of the head as the head moves under the tape. The read/write gap would be located somewhere in the region of the narrow waist where the flying height is relatively uniform and controllable within the desirable range of 20–50 microinches.

9 Claims, 7 Drawing Figures

WASP-WAIST HEAD FOR FLYING FLEXIBLE MAGNETIC STORAGE MEDIUM OVER HEAD

BACKGROUND OF THE INVENTION

This invention relates to flying a transducer relative to a flexible information storage medium. More particularly, the invention relates to flying a magnetic head which is much smaller than the smallest areal dimension of the flexible magnetic medium across which the head flies. Typically, the head would be mounted on a rotating wheel and would be scanning transversely across a magnetic tape. Alternatively, the head might be fixed on an access arm while a floppy magnetic disc rotates past the head.

HISTORY OF ART

Flying heads are well known in the area of scanning rigid magnetic medium such as a magnetic disc. Such an environment is comparable to flying an aircraft a few feet above ground over a hard surfaced runway. Consequently, many of the magnetic heads used with discs use air foil configurations with additional biasing to control the position. The biasing is typically spring loading or pneumatic loading.

In the area of flexible magnetic medium, flying heads are well known where the magnetic head reads the tape in the direction of motion of the tape and the head is large relative to the lateral dimension or width of the tape. Because of this relative size, the whole width of the tape flies relative to the head as it passes over the head. Flying has been accomplished in this area by using cylindrically shaped heads, air pressure, or vacuum to control the flying height of the entire width of the tape as it moves across the large head. Flying magnetic heads are unknown where the areal dimensions of the head surface is much smaller than the shortest areal dimension of the magnetic medium. This environment occurs today mostly in the rotating-head recording art and floppy disc recording art.

BRIEF DESCRIPTION OF BACKGROUND DRAWINGS

DESCRIPTION OF BACKGROUND TECHNOLOGY

Figure 1:
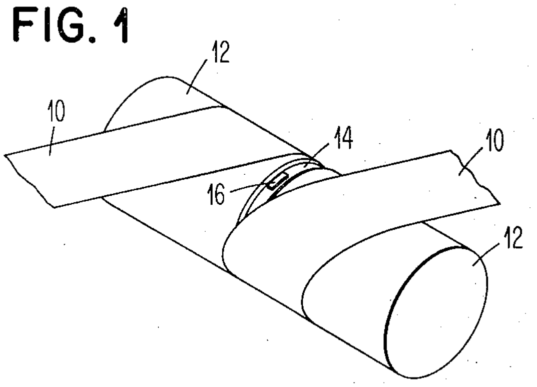
FIG. 1 shows a typical rotating head configuration where the tape is wrapped about a split mandrel and the head is carried by a rotating wheel in the middle of the mandrel.

In FIG. 1 magnetic tape 10 is wrapped about air bearing mandrel 12 which is split into two halves. Between the two halves of the mandrel is a rotating wheel or disc 14 that carries a magnetic head 16. Rotating disc 14 is moving at very high RPM so that the head 16 has a speed relative to the tape of over 1,000 inches per second. While the speed of the head is not critical to the invention, typically in the transverse or cross-tape recording technology the head is moving at a high rate of speed relative to the tape so as to be able to record high frequency signals on the tape. Tape 10 is moved about the mandrel 12 at a speed much slower than head speed, typically less than 10 inches per second continuously or incrementally.

Figure 2:
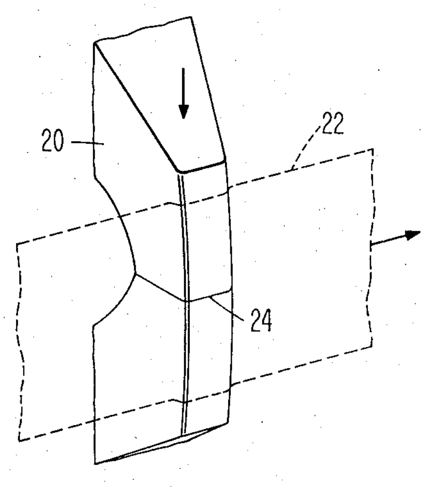
FIG. 2 PRIOR ART
FIG. 2 shows a prior art rotating head that does not fly.

The prior art magnetic head 20 shown in FIG. 2 contacts the tape 22 shown in phantom. With the head 20 in contact with the tape 22 recorded data density on the magnetic tape can be very high because there is good magnetic field coupling between the write gap 22 of the head 20 and the surface of the tape 22. However, there are rather drastic consequences of this in-contact condition with the head moving at high speed.

With head 20 moving at high speed relative to tape 22 and making contact with tape 22, tape 22 must be kept in motion constantly relative to the head 20. Otherwise, the head will in very short order (less than a minute) slice the tape 22 completely in two. This is caused by wear between the head 20 and the tape 22. Even if tape 22 is kept in constant motion relative to the head 20, the surface of the tape 22 is gradually degraded by the wear of the head against the tape surface.

Conversely, the magnetic oxide surface of the tape 22 acts like sandpaper to the surface of the head 20. Consequently, the life of the head 20 is measured in hours rather than days, weeks or months. Even though the prior art head 20 has very excellent characteristics for high density recording, this advantage is purchased at severe cost in wear on the tape and the head.

SUMMARY OF THE INVENTION

The problems of tape wear and head wear in moving a transducer at high speed across a flexible storage medium have been obviated by a flying head accomplished as follows. Head as used herein refers to the overall structure of the head whether the head is made up of transducing elements alone or transducing elements in combination with a mounting body. First the head is initially shaped by having its top surface rounded cylindrically or spherically with a radius small enough to penetrate into the aerodynamic bulge of the flexible medium as it flies over the head. The sides of this cylindrical or spherical surface are then beveled at an angle sufficient to achieve the wasp-waist or hourglass shape of the top surface of the head. The top surface is polished so as to round off any edges created by the beveling operation and in addition to assist in matching the contour of the top surface to the natural contour of the aerodynamic bulge in the tape as the tape flies over the head. This polishing may be accomplished by green-taping the top surface of the head.

In addition, when the head is mounted on the rotating wheel, it is positioned so as to create a wedge of air between the wide frontal portion of the top surface of the head and the flexible storage medium. This wedge of air may be achieved by mounting the head with a tip-down frontal angle, or by mounting the head so that the frontal portion of top surface of the head is lowered to a point nearly even with the surface of the mandrel, or by sliding the head along a chord of the rotating disc until the frontal portion of the head's top surface is even with the mandrel surface or below the mandrel surface. The narrow waist section of the head will still protrude above the surface of the mandrel, but the head will be mounted so that the large frontal surface of the head catches a wedge of air between the head and the tape. The tape will then aerodynamically bulge over the narrow waist section of the head and fly uniformly over the narrow waist section at a distance of 20–50 microinches above the head.

The great advantage of our invention is that high density recording can be achieved because the flying height is less than 50 microinches, while at the same time wear of the head and the tape is essentially eliminated. In fact, the wasp-waist head has been run for several days over the same track on the tape with almost no observable change to the surface of the tape or the surface of the head. This is in sharp contrast to the prior art head where running the head over the same track on the tape will slice the tape in two in less than a minute.

The foregoing and other features and advantages of the invention will be apparent from the following more particular description of preferred embodiments of the invention, as illustrated in the accompanying drawings.

BRIEF DESCRIPTION OF PREFERRED EMBODIMENT DRAWINGS

Figure 3:
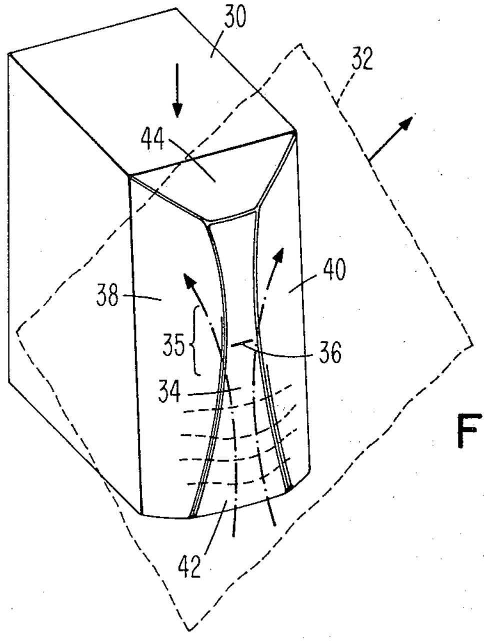

FIG. 3 shows the wasp-waist or hour-glass head flying relative to a magnetic medium shown in phantom.

Figure 4B:
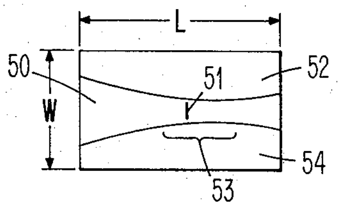
Figure 4A:
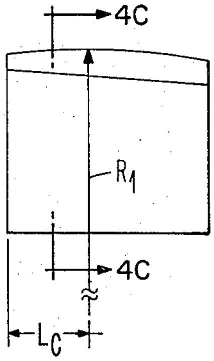
Figure 4C:
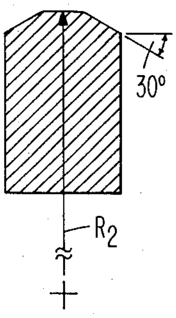

FIGS. 4A, 4B, and 4C show orthographic projection of another wasp-waist head.

Figure 5:
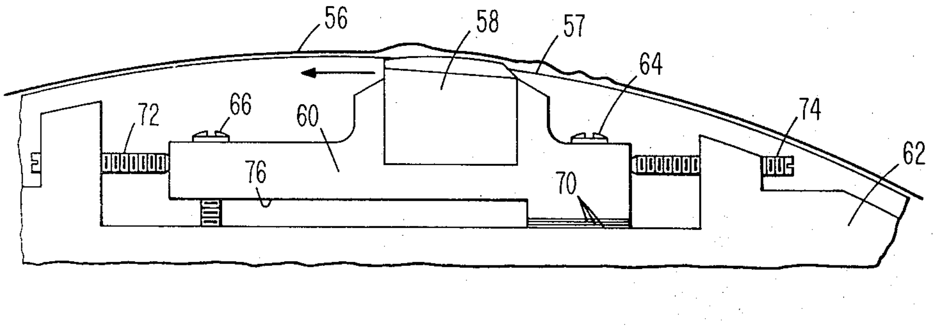

FIG. 5 shows a mount for mounting the wasp-waist head adjustably on the rotating disc.

DESCRIPTION OF PREFERRED EMBODIMENTS

Now referring to FIG. 3, one preferred embodiment of the invention is shown in perspective with a magnetic storage medium overlayed in phantom. The head 30 is moving at an angle relative to the direction of motion of the medium 32. Medium 32 may be moving simultaneously with the head 30 or may be moving incrementally between head scans. In any case, the velocity of the medium 32 is much less than the velocity of the head 30. Therefore, the head 30 records or reads a track which is slant or transverse relative to the direction of motion of the medium.

The top surface 34 of head 30 has a wasp-waist 35 with a gap 36 located somewhere near the waist portion of the surface 34. Top surface 34 is in fact a spherical surface. The radius of the sphere is approximately four-tenths of an inch. A relatively short radius betwen approximately 0.3 inches to 0.55 inches appears to penetrate into the aerodynamic bulge of the media 32 best in an environment where the media is approximately 1 ½ mil magnetic tape wrapped around approximately a 3 inch mandrel (12, FIG. 1) with approximately 0.2 inch breach between mandrel halves. Of course, other head surface radiuses may be more desirable for different size mandrels, different stiffnesses of tape and different width breaches. The significant design factor is that the contour of top surface should be such that relatively good protrusion into the aerodynamic bulge of the tape is achieved without contacting the tape.

The wasp-waist or hour-glass shape of the surface 34 is achieved by beveling the head 30 to obtain the side faces 38 and 40. This bevel makes approximately a 30° angle with the horizontal or width dimension of the head 30. The angle of the bevel is not critical, but it should be such that there is no potential for contact between the tape and the top edge of the bevel faces 38 and 40 and also sufficient so that some air trapped between the frontal portion 42 of the surface 34 and the tape media 32 can escape down the bevel surfaces in the region of the narrow waist 35.

The rear of the head 30 may be beveled to form rear face 40 so as to ensure that after the tape has passed over the head it will not contact the trailing edge of the head. All edges of the top surface 34 of the head are rounded during polishing of the head 30. The head 30 is polished typically by green-taping the head for a short time interval, possibly 30 seconds to one minute. (Green tape referred to herein is the name given abrasive tape having similar flexibility characteristics to magnetic tape. Green tape is used to polish surfaces, such as magnetic heads, in a tape guide path.) During green-taping, the head is mounted to protrude substantially above the surface of the mandrel so that there is good contact between the surface of the head and the green tape.

In read/write operation the head 30 is mounted so that the frontal portion 42 of the top surface 34 is near the surface of the mandrel. Then as the head 30 moves across the media 32, the frontal portion 42 of top surface 34 creates a wedge of air between the head and the medium. Thus an aerodynamic bulge appears in the medium 32. As the head 30 continues to move, the air caught between frontal portion 42 and medium 32 tends to escape down the beveled faces 38 and 40. This lowers the flying height of the medium 32 in the region of the wasp-waist 35.

It is in this region of narrow waist that the gap of the magnetic head should be placed. At this wasp-waist section, the flying height will be uniform approximately in the range of 20–50 microinches. The flying height is controllable by adjusting the angle of attack between the tape and the frontal portion 42 and by adjusting the width of the waist at its narrow point. Typically, at the most narrow point of the waist, the width is 10–30 mils. On the other hand, the width of the head near the frontal portion 42 is approximately 40–100 mils.

An alternative wasp-waist magnetic head is shown in orthographic projection in FIGS. 4A, 4B, and 4C. The wasp-waist head of FIG. 4 is slightly different in that it has a longer tail section. However, again it has the wasp-waist shape to its top surface 50 which operates in the same manner as previously described for FIG. 3 to cause the storage medium to fly relative to the head. The read/write gap 51 is placed in the narrow waist section 53 of the head.

The head shown in FIG. 4 has a cylindrical radius of approximately 0.46 inches and would be used also in an environment of a 3 inch mandrel (12, FIG. 1) and a tape thickness of approximately 1 ½ mils. The side faces 52 and 54 are again beveled at approximately 30° to the horizontal or width dimension of the head and the most narrow section of the wasp-waist is approximately 15 mils. The width of the head "W" is approximately 80 mils, while its length "L" is 140 mils. The edges between the top surface 50 and the beveled faces 52 and 54 would again be smoothed by green-taping. Also, the green-taping would tend to give the top surface 50 a lateral radii R2, as well as the initial cylindrical radius R1.

Given below are tables for three embodiments of the head showing typical dimensions and mounting position relative to the mandrel. It happens that the spherical and bi-radius heads are mounted so that their trailing edges protrude from the mandrel while the cylindrical head is mounted so that its trailing edge drops within the mandrel. There is no reason why the mounting position of the spherical or bi-radius heads and the cylindrical heads could not be interchanged. The dimension, "protrusion," in the following tables refers to the distance that the head at that point on the head protrudes above the surface of the mandrel (12 of FIG. 1). All dimensions are given in inches. Plus and minus signs indicate above and below the mandrel surface respectively.

CYLINDRICAL RADIUS HEAD

W=0.080", L=0.140", $R_1$=0.46", $L_c$=0.090", Waist=0.015"

| Location Relative to Front Edge | Protrusion | $R_2$* |
|---|---|---|
| 0.010 | +0.0010 | ∞ |
| 0.025 | +0.0021 | 0.91 |
| 0.055 | +0.00295 | 0.90 |
| 0.070 | +0.00278 | 0.46 |
| 0.085 | +0.00223 | 0.36 |
| 0.100 | +0.00135 | 0.49 |
| 0.115 | −0.00007 | ∞ |
| 0.130 | −0.00189 | ∞ |
| 0.140 | −0.0030 | ∞ |

* $R_2$ is not ∞ at each position because the head has been contoured by abrasive tape.

SPHERICAL RADIUS HEAD

W=0.080", L=0.140", $R_1$=0.4", $L_c$=0.090", Waist=0.015"

| Location Relative to Front Edge | Protrusion | $R_2$ |
|---|---|---|
| 0.000 | −0.0056 | 0.388 |
| 0.030 | −0.0011 | 0.394 |
| 0.050 | +0.0010 | 0.397 |
| 0.070 | +0.0023 | 0.399 |
| 0.090 | +0.0030 | 0.400 |
| 0.097 | +0.0030 | 0.400 |
| 0.110 | +0.0028 | 0.400 |
| 0.140 | +0.0013 | 0.398 |

BI-RADIUS HEAD

W=0.080", L=0.140", $R_1$=0.46", $L_c$=0.090", Waist=0.015"

| Location Relative to Front Edge | Protrusion | $R_2$ |
|---|---|---|
| 0.000 | −0.0056 | 0.776 |
| 0.030 | −0.0011 | 0.789 |
| 0.050 | +0.0010 | 0.794 |
| 0.070 | +0.0023 | 0.798 |
| 0.090 | +0.0030 | 0.800 |
| 0.110 | +0.0028 | 0.800 |
| 0.140 | +0.0013 | 0.795 |

It cannot be overemphasized that these dimensions are not critical dimensions in distinguishing over the art. They merely represent dimensions of operative heads that have worked in the environment of 3 inch mandrels with a breach of 0.2 inch between mandrel halves and operating with 1 ½ mil magnetic tape. What is significant is that the heads are wasp-waist in shape. The wasp-waist shape has been obtained by starting with a cylindrical, spherical or bi-radius surface whose radii are chosen to protrude into the aerodynamic bulge of the medium, and that by beveling this cylindrical, spherical or bi-radius surface a top surface with a wasp-waist is obtained.

Mounting of the wasp-waist heads is important as they must be positioned so that their frontal portion or face (42 of FIG. 3) will create a wedge of air between the surface of the head and the magnetic tape. It has been found that this is best achieved by mounting the head so that its leading edge is coincident with or near the surface of the mandrel and possibly below the surface of the mandrel. The leading edge of the head should not be above the surface of the mandrel unless the tape itself is flying relatively high above the surface of the mandrel due to the air bearing nature of the mandrel. Where the thickness of the air bearing between the tape and the mandrel is approximately 0–1,000 microinches, best operation is achieved by having the leading edge of the head coincident with or near the surface of the mandrel or below the surface of the mandrel, as shown in FIG. 5.

Tape 56 in FIG. 5 is supported by air bearing mandrel 57. Tape 56 bulges aerodynamically as head 58 moves under it. Noitce that the wedge of air at the frontal section of the head surface pushes tape 56 away from the head. Subsequently, tape 56 settles closer to the head in the region of the wasp-waist.

To position the leading edge of the head near the surface of the mandrel, the mount in FIG. 5 is capable of tipping the head, moving the head radially upward or sliding the head along a chord of the rotating disc. The mount consists of a bracket 60 attached to the rotating disc 62 via screws 64 and 66. Bracket 60 is bonded to the head 58. The height of the head 68 along a radius may be changed by inserting shims 70 between the bracket 60 and the rotating disc 62. Alternatively, shims could be placed between the head 58 and the bracket 60.

Sliding the head along a chord line of the rotating disc is accomplished by adjusting screws 72 and 74. During such adjustment, screws 64 and 66, which pass through slots in the bracket and hold the bracket to the disc 62, must be loosened.

Tipping adjustment of the magnetic head 58 can be accomplished by tightening screw 66 to force a slight bending of the bracket 60 about the undercut 76.

It will be appreciated by one skilled in the art that many mounts could be used to mount the head on the rotating disc. The only significance in the mounting lies in the fact that there must be an attack angle between the frontal portion 42 (FIG. 3) of the top surface 34 (FIG. 3) of the head and the magnetic tape so as to create a wedge of air between the tape and the head prior to the tape moving over the narrow waist section of the top surface 34.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An air bearing transducer for flying in an aerodynamic bulge in a flexible storage medium within tens of microinches of the top surface of the transducer during relative motion between transducer and medium, the multilateral transducer body having:

a convex top surface adjacent the storage medium contoured with a radius of curvature aligned with or nearly aligned with the direction of relative motion;

the sides of the transducer body being substantially parallel to the plane of said radius of curvature and contoured by a bevel between the top surface and said sides to form the periphery of the top surface into a wasp-waist shape with a wide frontal portion followed by a narrow waist and a wide rear portion;

a transducing gap located on the top surface proximate to the narrow waist.

2. The transducer of claim 1 wherein said top surface has a second radius of curvature whose plane is perpendicular to the plane of the first radius of curvature, said second radius is substantially the same as said first radius.

3. The transducer of claim 1 wherein said top surface has a second radius of curvature whose plane is perpendicular to the plane of the first radius of curvature, said second radius is larger than said first radius.

4. Storage apparatus for reading and writing stored information during relative movement of a transducer and storage medium comprising:

a read/write transducer having a top surface, a flexible, information-storage medium whose shortest areal dimension is much larger than the areal dimensions of said top surface of said read/write transducer;

said top surface having a convex contour with a wide frontal section followed by a narrow pressure relief section to create a hydrodynamic air bearing between medium and transducer so that air trapped between the frontal section and the medium by the relative motion between transducer and medium can subsequently escape at the narrow pressure relief section lowering the medium to a uniform flying height of tens of microinches in the pressure relief section, whereby the transducer penetrates into the flexible medium to form an aerodynamic bulge with the medium flying over the transducer within tens of microinches of said top surface without contacting said top surface;

a transducing gap located in the narrow pressure relief section of said surface where the flying height of the medium is uniform.

5. Transducing apparatus on a rotary wheel for reading and writing information on a flexible magnetic storage medium wrapping a mandrel adjacent the rotary wheel as the transducing apparatus rotates, said apparatus comprising:

a magnetic head having a convex top surface and sides sloping away from the convex top surface giving the periphery of the top surface an hour-glass shape, the frontal and rear portions of the top surface being wide relative to the waist of the top surface;

a magnetic gap in the top surface of the head for reading or writing information on the storage medium, said gap being near the waist of the top surface;

means for mounting said head on the rotary wheel with an angle of attack between the frontal portion and the medium to form a wedge of air between the head and the medium, the wedge of air being partially dissipated near the waist of said head so that the medium flies near the surface of the head in the region of said magnetic gap.

6. The apparatus of claim 5 wherein said mounting means comprises:

means for adjusting said head relative to the mandrel so that the frontal portion of said head is substantially even with the mandrel surface while the waist of the head protrudes above the mandrel surface.

7. The apparatus of claim 5 wherein said head has:

a convex top surface contoured to spherical radius.

8. The apparatus of claim 5 wherein said head has:

a convex top surface contoured bi-radially with the shorter radius oriented in the direction of motion of the head.

9. The apparatus of claim 5 wherein said head has:

a convex top surface initially contoured cylindrically with the radius of curvature oriented in the direction of motion of the head and said head having a finished compound curve contour after the initial cylindrical contour is polished with a flexible abrasive web.

* * * * *